United States Patent [19]

Bychkowsky

[11] Patent Number: 5,765,255
[45] Date of Patent: Jun. 16, 1998

[54] DIPSTICK WIPING DEVICE

[76] Inventor: Mark Walter Bychkowsky, 36 Rose Street, Flin Flon, Manitoba, Canada, RBA OY2

[21] Appl. No.: 823,309

[22] Filed: Mar. 21, 1997

[51] Int. Cl.$^6$ .................................................. G01F 15/12
[52] U.S. Cl. .................... 15/220.4; 15/210.1; 15/244.1
[58] Field of Search .................. 15/210.1, 220.4, 15/244.1

[56] References Cited

U.S. PATENT DOCUMENTS

| | | | |
|---|---|---|---|
| 1,102,965 | 7/1914 | Smith | 15/220.4 |
| 2,855,682 | 10/1958 | Norgard . | |
| 3,205,525 | 9/1965 | Birtzer | 15/220.4 |
| 3,460,181 | 8/1969 | Denver | 15/220.4 |
| 4,017,935 | 4/1977 | Hernandez . | |
| 4,245,367 | 1/1981 | Stoute | 15/220.4 |
| 4,419,781 | 12/1983 | Meegan | 15/220.4 |
| 4,506,402 | 3/1985 | Sherman | 15/220.4 |
| 4,942,669 | 7/1990 | Schnedl . | |
| 5,598,602 | 2/1997 | Gibson | 15/220.4 |

FOREIGN PATENT DOCUMENTS

| | | | |
|---|---|---|---|
| 0520210 | 1/1956 | Canada | 15/220.4 |
| 0119671 | 9/1984 | European Pat. Off. | 15/220.4 |

*Primary Examiner*—Randall Chin
*Attorney, Agent, or Firm*—Adrian D. Battison; Murray E. Thrift

[57] ABSTRACT

A dipstick wiping device for use in measuring fluid reservoir levels in an internal combustion engine is described. The dipstick wiping device comprises a pliable converging tubular body, a fluid wiping element and mounting means. The fluid wiping element comprises a sponge removably mounted around the inner surface of the body by a locking ring. The dipstick wiping device is connected to a dipstick tube by first removing the dipstick from the dipstick tube and then fitting the mounting means over the end of the dipstick tube. The mounting means includes a tie strap for locking the dipstick wiping device into place. The tie strap allows the dipstick wiping device to be mounted on a variety of dipstick tubes, regardless of the diameter of the dipstick tube. The dipstick is then reinserted into the dipstick tube by passing the dipstick through the body. In operation, the user removes the dipstick from the dipstick tube while applying pressure to the outer surface of the pliable converging tubular body. This pressure forces the fluid wiping element inward such that the sponge cleans the dipstick during removal. The pressure is then released and the clean dipstick is reinserted into the dipstick tube to measure the fluid level. Of note is that the dipstick wiping device is designed as an add-on device and all factory-installed components are retained, thereby minimizing the risk of contamination to the fluid.

7 Claims, 2 Drawing Sheets

DIPSTICK WIPING DEVICE

The present invention relates to a dipstick wiping device for use in measuring fluid reservoir levels.

BACKGROUND OF THE INVENTION

As part of routine maintenance, it is necessary to periodically check lubricating fluid levels in internal combustion engines. Generally, this comprises removing a graduated dipstick from a dipstick tube connected to the lubricating fluid reservoir and cleaning the dipstick with either a rag or a paper towel. To measure the fluid level, the dipstick is reinserted into the dipstick tube and then removed. However, there is considerable concern over the build-up of petroleum product-contaminated waste in disposal sites. As a consequence, several devices have attempted to solve this problem by providing a reusable dipstick wiping device arranged to be mounted directly onto the dipstick tube.

U.S. Pat. No. 2,855,682 teaches a dipstick wiping device comprising a threaded collar arranged to be attached to a dipstick tube and two pliable arms extending upwards from the threaded collar. The ends of the pliable arms include sponges for cleaning the dipstick as described below. In operation, the user applies pressure to the pliable arms, thereby bringing the ends of the pliable arms together while removing the dipstick from the dipstick tube so that the sponges clean the sides of the dipstick. However, the dipstick must be properly oriented so that the sponges clean the graduated sides of the dipstick. Furthermore, the sponges are relatively small in size and therefore limited in the amount of fluid that can be absorbed. This problem is compounded by the fact that the device is not enclosed, meaning that any fluid not absorbed by the sponges will leak onto the engine, thereby creating a mess as well as a potential hazard.

U.S. Pat. No. 4,017,935 teaches a dipstick wiping device comprising mounting means for attaching the device to the dipstick tube and a planar surface elevated from the mounting means having a slotted portion for passing a dipstick therethrough. The planar surface is arranged to pivot relative to the mounting means and the slotted portion includes flaps for cleaning the dipstick. In operation, the dipstick is inserted through the slotted portion into the dipstick tube. When the dipstick is withdrawn, the flaps wipe the dipstick clean. To measure the fluid level, the planar surface is pivoted away from the dipstick tube, the dipstick is reinserted into the dipstick tube and then removed. Obviously, the flaps will be limited in their ability to absorb fluid from the dipstick. Furthermore, the device is not enclosed, meaning that any fluid not absorbed by the flaps will leak onto the engine. Finally, the device must be serviced regularly, as the pivoting means must be functional in order for the device to be operational.

U.S. Pat. No. 4,942,669 teaches a dipstick wiping device comprising a funnel-shaped body terminating in a cylindrical vertical wall. The cylindrical vertical wall includes an aperture at its center for passing the dipstick therethrough. In addition, one or more wiper slots extend radially from the aperture. In operation, the user removes the dipstick from the dipstick tube through one of the wiper slots, thereby cleaning the dipstick. The dipstick is then reinserted into the dipstick tube and removed through the aperture, thereby measuring the fluid level in the reservoir. However, great care must be taken during this process to ensure that the dipstick does not contact the sides of the aperture and obscure the fluid level measurement. One other limitation of this device is that over time, residue will build up on the wiper slots, thereby preventing their use and eventually necessitating replacement of the entire cylindrical vertical wall.

SUMMARY OF THE INVENTION

It is one object of the invention, therefore, to provide a dipstick wiping device that avoids messes, is easy to use and is environmentally friendly.

According to a first aspect of the invention, there is provided a dipstick wiping device for use in verifying fluid reservoir levels comprising:

- a pliable converging tubular body comprising an inner surface and an outer surface, said pliable converging tubular body arranged for passing a dipstick therethrough;
- a fluid wiping element surrounding the inner surface of the pliable converging tubular body; and
- attachment means for connecting the pliable converging tubular body to a dipstick tube,
- wherein the dipstick wiping device is arranged such that the dipstick passes freely through the pliable converging tubular body in the absence of pressure applied to the outer surface of the pliable converging tubular body and applied pressure to said outer surface during removal of the dipstick from the dipstick tube promotes cleaning of both sides of the dipstick by the fluid wiping element. The fluid wiping element surrounds the entire inner surface of the pliable converging tubular body, so as to provide a significant amount of surface area for absorbing fluid from the dipstick. Furthermore, the device is enclosed so that any fluid not absorbed by the sponge will be retained.

Preferably, the fluid wiping element is removable and comprises a sponge having an absorbent outer surface. The dipstick wiping device may include an annular ring for removably attaching the fluid wiping element to the inner surface of the pliable converging tubular body. Thus, the fluid wiping element can be removed and cleaned or replaced as it becomes soiled.

The pliable converging tubular body may have a substantially conical shape.

Preferably, the dipstick tube comprises a top and the attachment means comprises a tie-strap for connecting the pliable converging tubular body to the top of the dipstick tube. As a consequence of this arrangement, the above-described dipstick wiping device may be connected to practically any dipstick tube, regardless of the diameter of the dipstick tube.

Thus, the above-described dipstick wiping device is arranged to be fitted over a wide variety of dipstick tubes and does not require the removal of any factory-installed components. The dipstick wiping device includes a fluid wiping element that has a large absorbent surface area for cleaning the dipstick. Furthermore, as the dipstick wiping device is enclosed, any fluid not absorbed will not drip onto the engine block. Finally, the fluid wiping element can quickly and easily be removed for cleaning or replacement.

DETAILED DESCRIPTION

Figure 1:
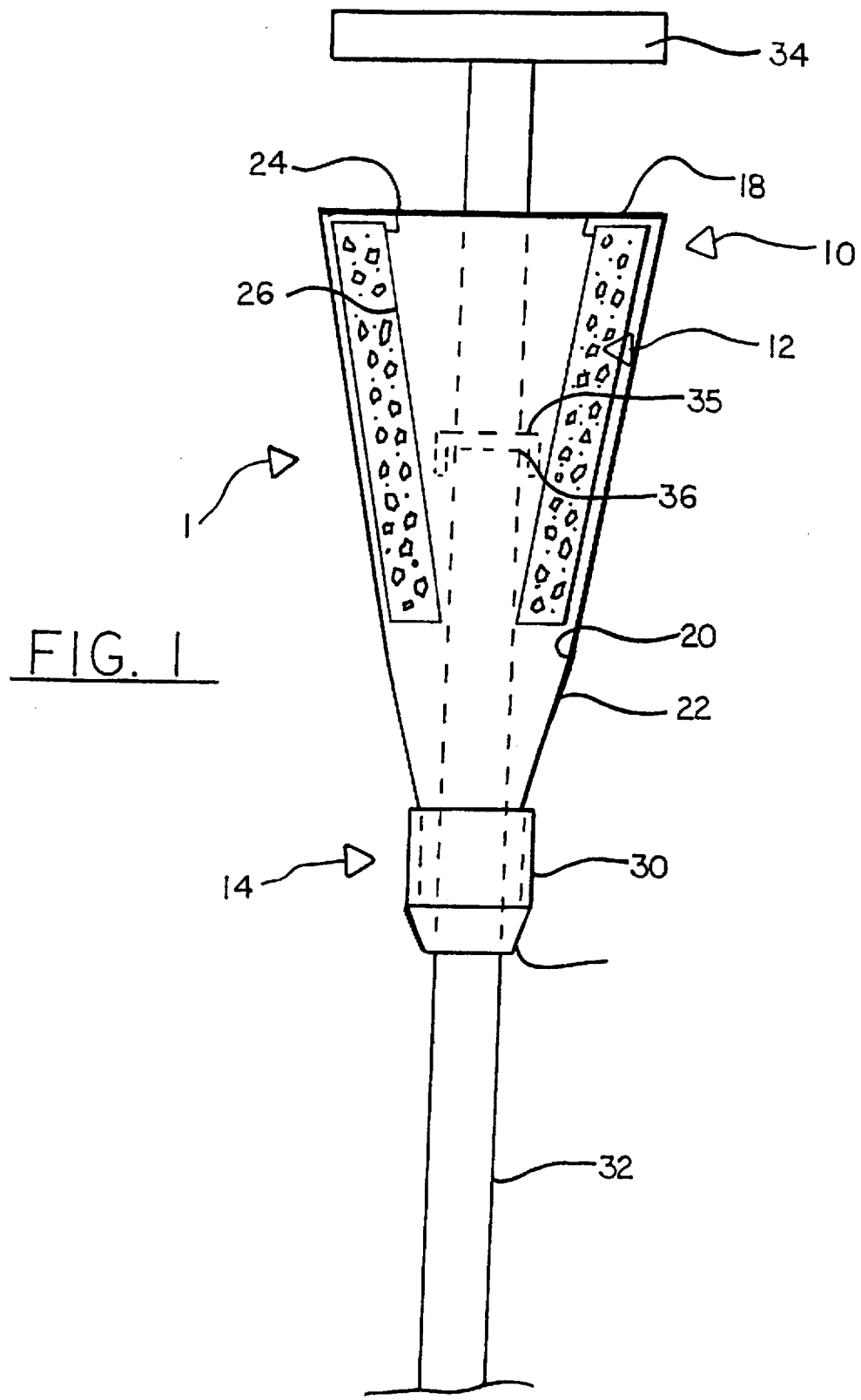
FIG. 1 is a side view of the dipstick wiping device.
Figure 2:
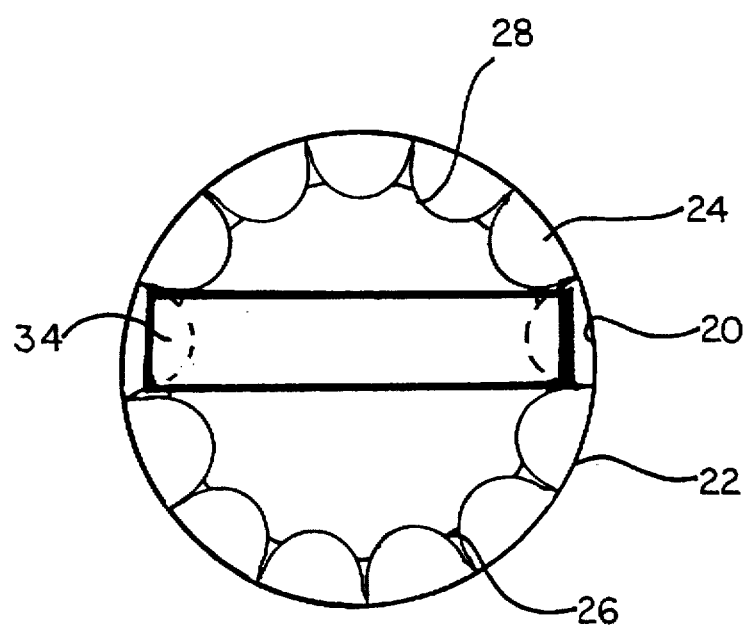
FIG. 2 is a top plan view of the dipstick wiping device.

In one embodiment, the dipstick wiping device 1 comprises a body 10, a fluid wiping member 12 and a mounting member 14, as shown in FIG. 1.

The body 10 has a substantially converging tubular shape and is pliable. In the preferred embodiment, the body 10 has a substantially conical shape. The body 10 further comprises a first end 16, a second end 18, an inner surface 20 and an outer surface 22. Of note is that the body 10 is arranged such that the second end 18 has a diameter that is greater than the diameter of the first end 16. The body 10 is connected at the first end 16 to the mounting member 14 as described below. The fluid wiping member 12 is attached to the inner surface 20 of the body 10 as described below. Of note is that the body 10 is arranged for passing a dipstick therethrough as described below.

The fluid wiping member 12 comprises a locking ring 24 and a highly absorbent sponge 26 attached to the inner surface 20 of the body 10 so that the sponge 26 surrounds the inner surface 20 of the body 10. The locking ring 24 is integrally molded to the body 10 and the locking ring 24 comprises a plurality of arcuate flaps 28 arranged to project inward from the body 10 and then downward. The sponge 26 is fitted under the plurality of arcuate flaps 28, thereby locking the sponge 26 in position inside the body 10. Arrangement of the locking ring 24 as a plurality of arcuate flaps 28 provides greater flexibility and pliability as described below. Furthermore, the sponge 26 is held securely in place by this arrangement so that the sponge 26 will not be dislodged by air flow or physical shocks.

The mounting member 14 comprises a tie strap 30 attached to the first end 16 of the body 10. The mounting member 14 is fitted over the end of a dipstick tube and the tie strap 30 is tightened, thereby allowing the dipstick wiping device 1 to be installed on dipstick tubes of various diameters, as described below.

The dipstick wiping device 1 is connected to a dipstick tube 32, the dipstick tube 32 including a dipstick 34, a bell 35 and a first end 36. Of note is that the dipstick tube 32 is connected to a lubricating fluid reservoir, such as, for example, an oil pan. The details of the lubricating fluid reservoir are not shown as these will be well-known to one skilled in the art. The dipstick 34 is graduated for measuring the fluid level in the reservoir. The bell 35 fits over the first end 36 of the dipstick tube 32, acting as a seal to prevent contamination of the fluid. First, the dipstick 34 is removed from the dipstick tube 32 and the mounting member 16 is fitted over the first end 36 of the dipstick tube 34. The tie strap 30 is tightened, thereby mounting the dipstick wiping device 1 to the dipstick tube 32. The dipstick 34 is then reinserted into the dipstick tube 32 by passing the dipstick 34 through the body 10 of the dipstick wiping device 1. As noted above, the body 10 of the dipstick wiping device 1 is arranged for passing a dipstick 34 freely therethrough.

In operation, the user removes the dipstick 34 from the dipstick tube 32 while applying pressure to the outer surface 22 of the body 10. As noted above, the body 10 is pliable and the locking ring 24 is comprised of a plurality of arcuate flaps 28. Thus, pressure applied to the outer surface 22 of the body 10 will force the sponge 26 toward the center of the body 10 such that the sponge 26 contacts the sides of the dipstick 34 while the dipstick 34 is being removed from the dipstick tube 32, thereby cleaning the dipstick 34. As noted above, the plurality of arcuate flaps 28 are arranged to be flexible and pliable, as is the body 10. As such, these components are resistant to applied pressure. Once the dipstick 34 is withdrawn, the pressure on the outer surface 22 of the body 10 is released and the clean dipstick 34 is reinserted into the dipstick tube 32. The dipstick 34 is then removed from the dipstick tube 32 and the fluid level determined. As noted above, once the sponge 26 of the fluid wiping member 12 becomes soiled from use, the sponge 26 can be removed from the locking ring 24 and cleaned or replaced. Of note is that all of the factory-installed components of the dipstick tube are retained. Thus, the above-described dipstick wiping device is truly an add-on device. As such, the risk of contamination of the fluid by foreign matter is minimized.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A dipstick wiping device for use in verifying fluid reservoir levels comprising:

a pliable converging tubular body comprising an inner surface and an outer surface, said pliable converging tubular body arranged for passing a dipstick therethrough;

a fluid wiping element substantially encircling the inner surface of the pliable converging tubular body; and attachment means for connecting the pliable converging tubular body to a dipstick tube, wherein the dipstick wiping device is arranged such that the dipstick passes freely through the pliable converging tubular body in the absence of pressure applied to the outer surface of the pliable converging tubular body and pressure applied to said outer surface during removal of the dipstick from the dipstick tube cleans both sides of the dipstick simultaneously with the fluid wiping element.

2. The dipstick wiping device according to claim 1 wherein the fluid wiping element is readily replaceable.

3. The dipstick wiping device according to claim 2 wherein the fluid wiping element comprises a sponge having an absorbent outer surface.

4. The dipstick wiping device according to claim 3 including an annular ring for removably attaching the fluid wiping element to the inner surface of the pliable converging tubular body.

5. The dipstick wiping device according to claim 1 wherein the pliable converging tubular body has a substantially conical shape.

6. The dipstick wiping device according to claim 1 wherein the dipstick tube comprises a top and the attachment means comprises a tie-strap for connecting the pliable converging tubular body to the top of the dipstick tube.

7. A dipstick wiping device for use in verifying fluid reservoir levels comprising:

a pliable converging tubular body comprising an inner surface and an outer surface, said pliable converging tubular body arranged for passing a dipstick therethrough;

a fluid wiping element substantially encircling the inner surface of the pliable converging tubular body;

an annular ring for removably attaching the fluid wiping element to the inner surface of the pliable converging tubular body; and attachment means for connecting the pliable converging tubular body to a dipstick tube, wherein the dipstick wiping device is arranged such that the dipstick passes freely through the pliable converging tubular body in the absence of pressure applied to the outer surface of the pliable converging tubular body and pressure applied to said outer surface during removal of the dipstick from the dipstick tube cleans both sides of the dipstick simultaneously with the fluid wiping element.

* * * * *